(12) United States Patent
Elliott et al.

(10) Patent No.: US 7,761,738 B2
(45) Date of Patent: Jul. 20, 2010

(54) ESTABLISHING COMMUNICATIONS ACROSS VIRTUAL ENCLOSURE BOUNDARIES

(75) Inventors: John C. Elliott, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 11/470,856

(22) Filed: Sep. 7, 2006

(65) Prior Publication Data

US 2008/0065824 A1    Mar. 13, 2008

(51) Int. Cl.
*G06F 11/00* (2006.01)
(52) U.S. Cl. ............................................. 714/7; 714/42
(58) Field of Classification Search ...................... 714/5, 714/7, 42
See application file for complete search history.

(56) References Cited

U.S. PATENT DOCUMENTS

| | | | | |
|---|---|---|---|---|
| 5,345,590 | A * | 9/1994 | Ault et al. ........................ | 718/1 |
| 5,416,921 | A * | 5/1995 | Frey et al. ...................... | 714/11 |
| 6,601,187 | B1 * | 7/2003 | Sicola et al. .................... | 714/6 |
| 6,766,466 | B1 * | 7/2004 | Jibbe ............................. | 714/4 |
| 6,883,065 | B1 | 4/2005 | Pittelkow | |
| 6,944,785 | B2 * | 9/2005 | Gadir et al. ..................... | 714/4 |
| 7,043,663 | B1 * | 5/2006 | Pittelkow et al. ................ | 714/4 |
| 7,275,180 | B2 * | 9/2007 | Armstrong et al. ............. | 714/13 |
| 7,500,134 | B2 * | 3/2009 | Madnani et al. ................. | 714/4 |
| 2002/0191537 | A1 * | 12/2002 | Suenaga ..................... | 370/221 |
| 2002/0194294 | A1 | 12/2002 | Blumenau et al. | |
| 2003/0018927 | A1 * | 1/2003 | Gadir et al. ..................... | 714/4 |
| 2003/0131182 | A1 * | 7/2003 | Kumar et al. ................... | 711/5 |
| 2003/0217310 | A1 | 11/2003 | Ebsen et al. | |
| 2004/0177195 | A1 * | 9/2004 | Buckland et al. ............ | 710/300 |
| 2005/0010843 | A1 * | 1/2005 | Iwamitsu et al. ............. | 714/724 |
| 2005/0028028 | A1 * | 2/2005 | Jibbe ............................. | 714/6 |
| 2005/0034027 | A1 * | 2/2005 | Hamilton et al. .............. | 714/43 |
| 2005/0114595 | A1 | 5/2005 | Karr et al. | |
| 2005/0210098 | A1 | 9/2005 | Nakamichi et al. | |
| 2006/0149881 | A1 * | 7/2006 | Clayton et al. .............. | 710/302 |
| 2006/0235937 | A1 * | 10/2006 | Wu et al. ..................... | 709/214 |

* cited by examiner

*Primary Examiner*—Robert Beausoliel
*Assistant Examiner*—Elmira Mehrmanesh
(74) *Attorney, Agent, or Firm*—Dan Shifrin

(57) ABSTRACT

A high density storage enclosure houses first and second pluralities of hard disk drives (HDDs). The enclosure may be partitioned into a plurality of virtual enclosures, the first plurality of HDDs being associated with a first virtual enclosure and the second plurality of HDDs being associated with a second virtual enclosure. In the event of a failure within one of the virtual enclosures, an SES in the failed virtual enclosure is isolated from the rest of the virtual enclosure. Then, an inter-enclosure link may be enabled between the failed virtual enclosure and another virtual enclosure. The isolated SES processor may then be accessed to obtain data associated with the failure and to execute commands associated with a recovery process.

20 Claims, 10 Drawing Sheets

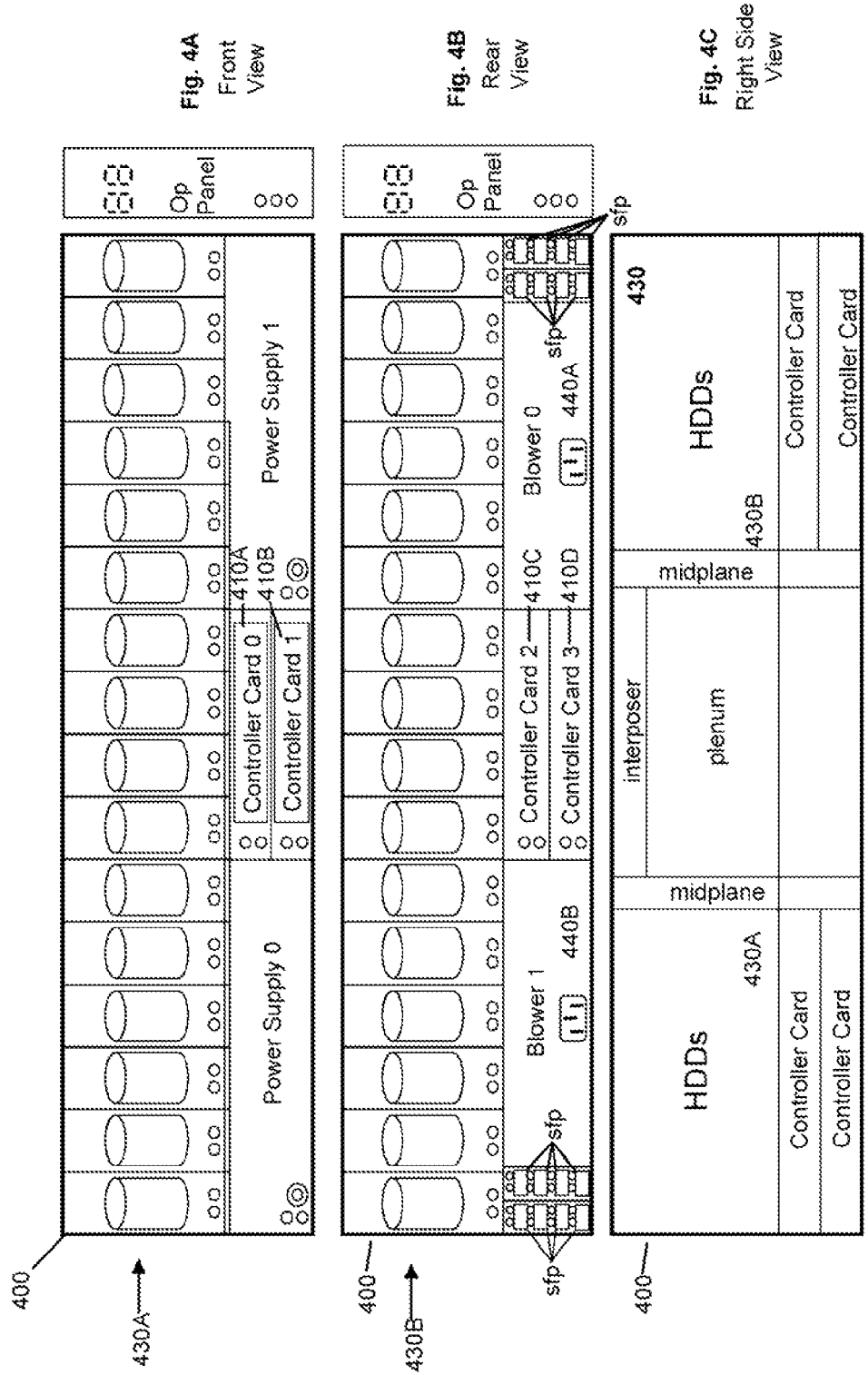

ESTABLISHING COMMUNICATIONS ACROSS VIRTUAL ENCLOSURE BOUNDARIES

RELATED APPLICATION DATA

The present application is related to commonly-assigned and co-pending U.S. application Ser. No. 11/470,834, entitled LOGICAL PARTITIONING OF DISK STORAGE ENCLOSURE, 11/470,885, entitled FLEXIBLE DISK STORAGE ENCLOSURE, and 11/470,907, entitled RECONFIGURABLE FC-AL STORAGE LOOPS IN A DATA STORAGE SYSTEM, filed on the filing date hereof, which applications are incorporated herein by reference in their entireties.

TECHNICAL FIELD

The present invention relates generally to data storage enclosures and, in particular, to enabling legacy control software, originally designed for low density storage enclosures, to be used with more densely populated storage enclosures.

BACKGROUND ART

FIG. 1 is a block diagram of a low density storage enclosure 100. The storage enclosure 100 includes a pair of redundant controller cards 110A, 110B, redundant power supplies 120A, 120B and sixteen disk drive modules (DDMs, also referred to as storage drives, hard disk drives or HDDs) indicated generally as 130. The storage enclosure 100 also includes an enclosure midplane 140 and front and rear panels 150A, 150B. As illustrated in FIG. 2, each controller card 110A, 110B includes a switch 112A, 112B, interconnected through the midplane to the storage drives 130, and a storage enclosure services (SES) processor 114A, 114B which manages various enclosure-related processes, such as power and cooling. Due to the interconnection through the midplane between the SES processors 114A, 114B, in the event that one of the controller cards 110A, 110B fails, the other SES processor may take over. FIG. 3 illustrates the interconnection of the power supplies 120A, 120B with the controller cards 110A, 110B and the DDMs 130 within the enclosure 100.

SUMMARY OF THE INVENTION

When additional DDMs, such as another sixteen, are installed in the enclosure 100, software, firmware and microcode designed for a sixteen-drive enclosure may not be able to accommodate the increased density. To control development effort and resources it is desirable to preserve the existing software, firmware and microcode base with minimal changes, while increasing the storage device density per unit of rack space. A single mechanical enclosure package that can accommodate multiple instances of enclosure designs that preserves the existing software, firmware, and microcode base interfaces is therefore highly desirable.

The present invention provides a high density storage enclosure housing first and second pluralities of hard disk drives (HDDs). The enclosure may be partitioned into a plurality of virtual enclosures, the first plurality of HDDs being associated with a first virtual enclosure and the second plurality of HDDs being associated with a second virtual enclosure. In the event of a failure within one of the virtual enclosures, an SES in the failed or degraded virtual enclosure is isolated from the rest of the virtual enclosure. Then, an inter-enclosure link may be enabled between the failed virtual enclosure and another virtual enclosure. The isolated SES processor may then be accessed to obtain data associated with the failure and to execute commands associated with a recovery process.

The inter-enclosure link may be an out-of-band communication fabric, such as an inter-IC ($I^2C$) bus, or another link, such as a Fibre Channel/Arbitrated Loop (FC-AL) link. Additionally, an SES processor in the other virtual enclosure may act as a proxy for the SES processor in the failed or degraded virtual enclosure.

BRIEF DESCRIPTION OF THE DRAWINGS

FIGS. 4A, 4B, 4C illustrate front, rear and right side views, respectively, of a high density storage enclosure in which the present invention may be incorporated;

DETAILED DESCRIPTION OF THE PREFERRED EMBODIMENT

Figure 1:
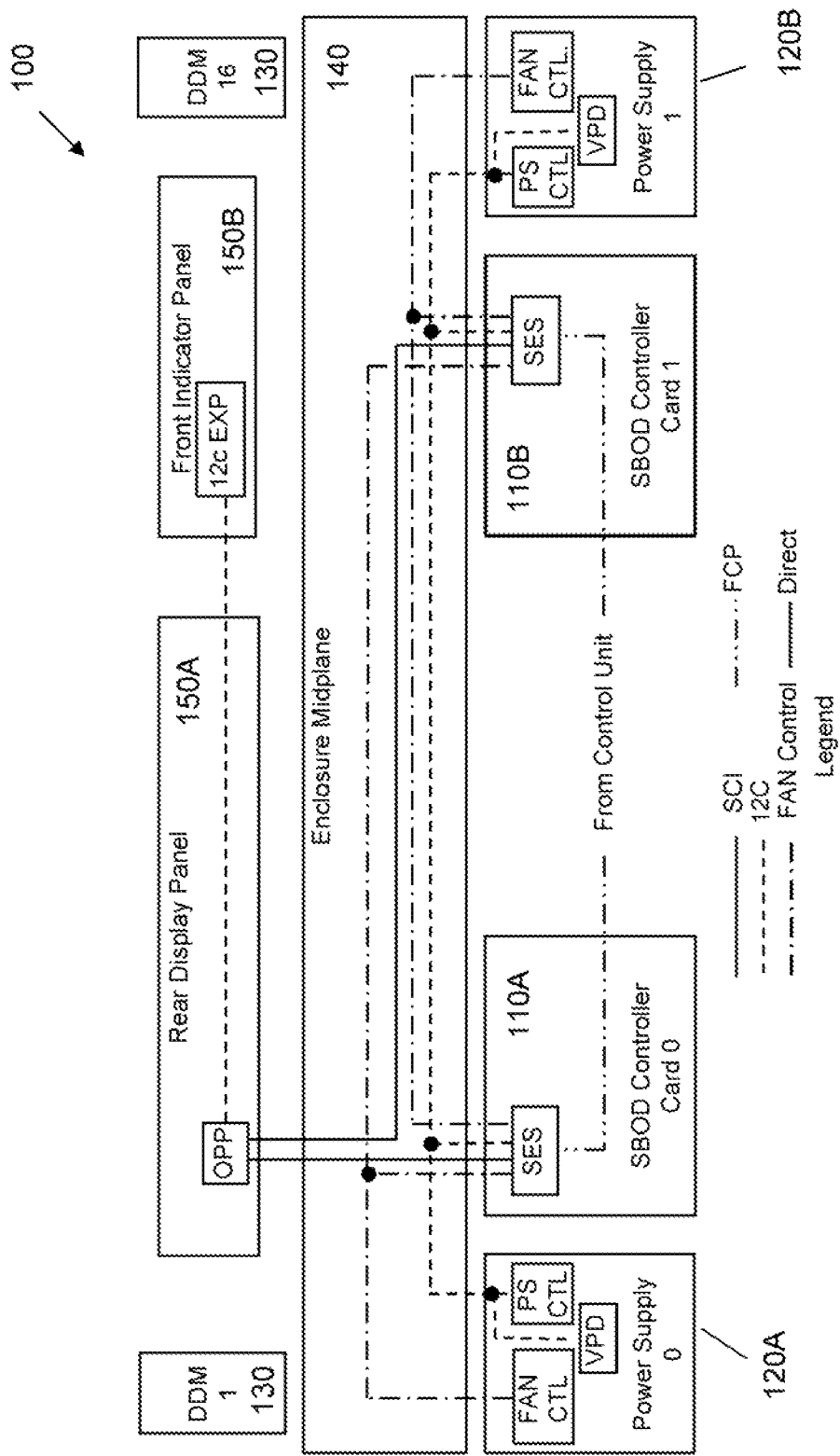
FIG. 1 is a block diagram of a low density storage enclosure.
Figure 2:
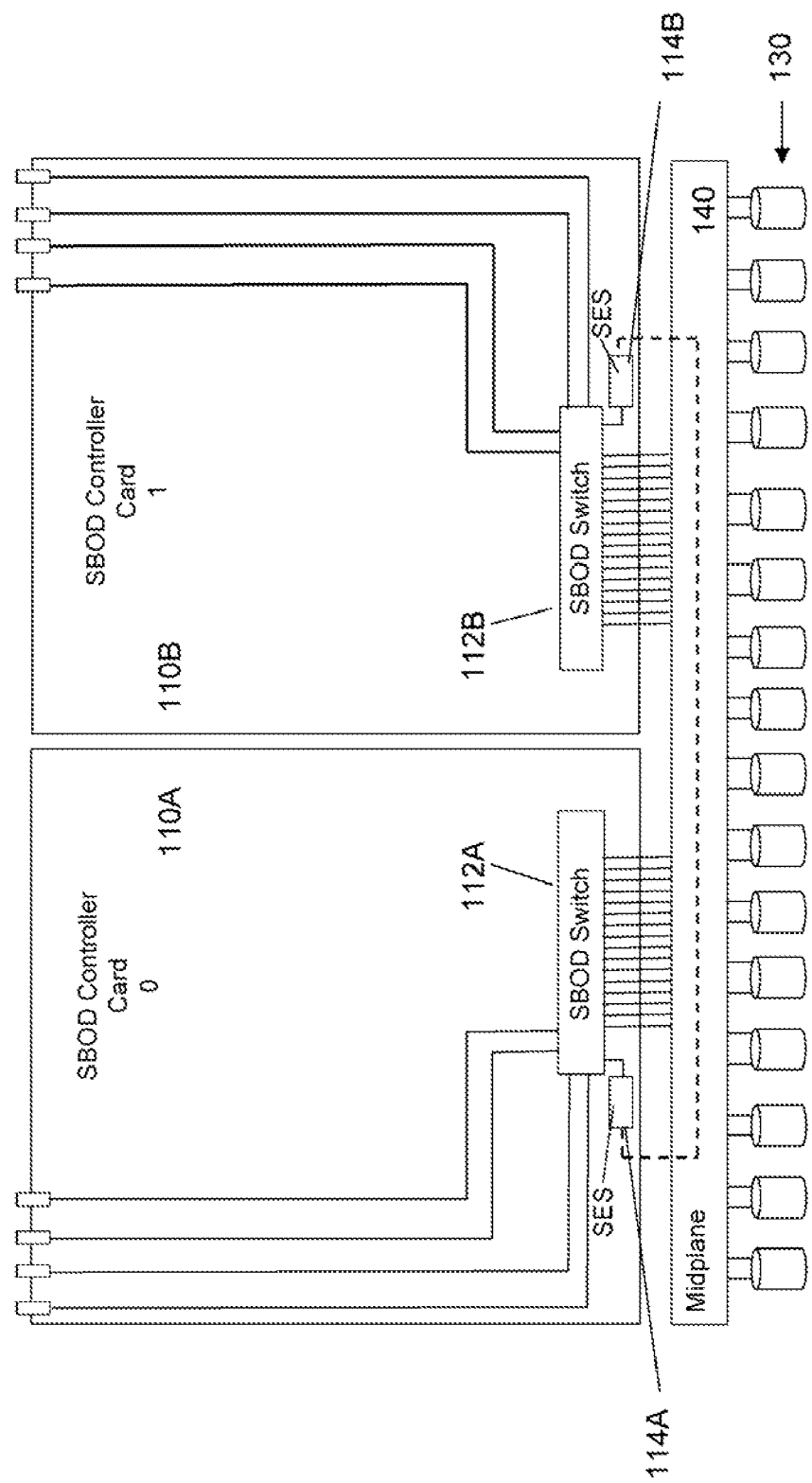
FIG. 2 is a block diagram illustrating interconnections of the controller cards of the storage enclosure of FIG. 1.
Figure 3:
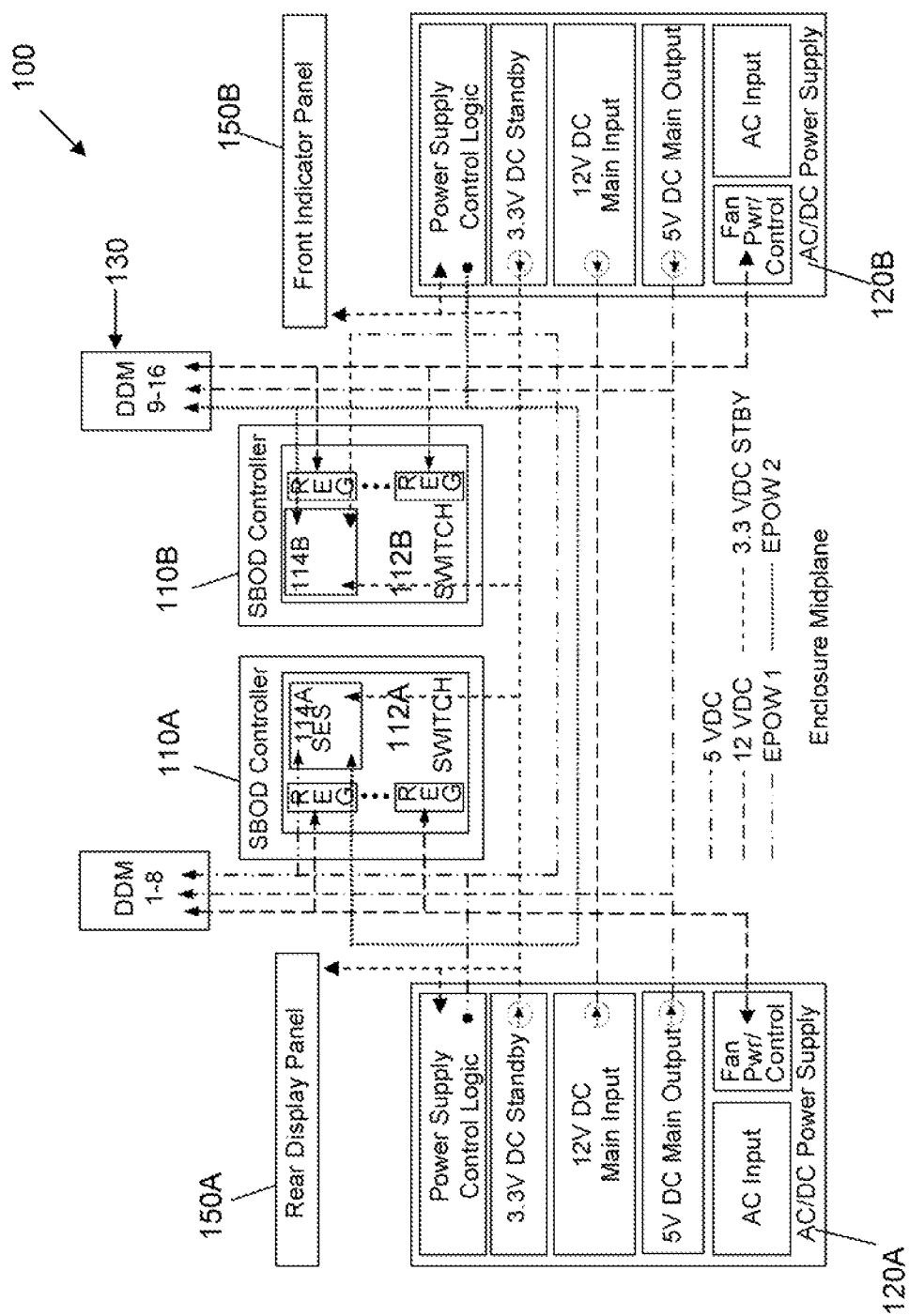
FIG. 3 is a block diagram illustrating the power distribution within the storage enclosure of FIG. 1.

FIGS. 4A, 4B 4C are representative front, rear and right side views, respectively, of a high density storage enclosure 400 in which thirty-two DDMs 430 have been installed, double the number in the enclosure of FIG. 1. In addition, the enclosure 400 includes two pairs of redundant controller cards 410A and 410B, 410C and 410D as well as a pairs of redundant power supplies 420A, 420B and blowers 440A, 440B. If desired, the enclosure 400 may be configured with a single instance of a storage enclosure (16 DDMs and a single pair of controller cards) by populating a single pair of controller cards in the enclosure and restricting the population of the DDMs to an appropriate placement within the enclosure.

Figure 5A:
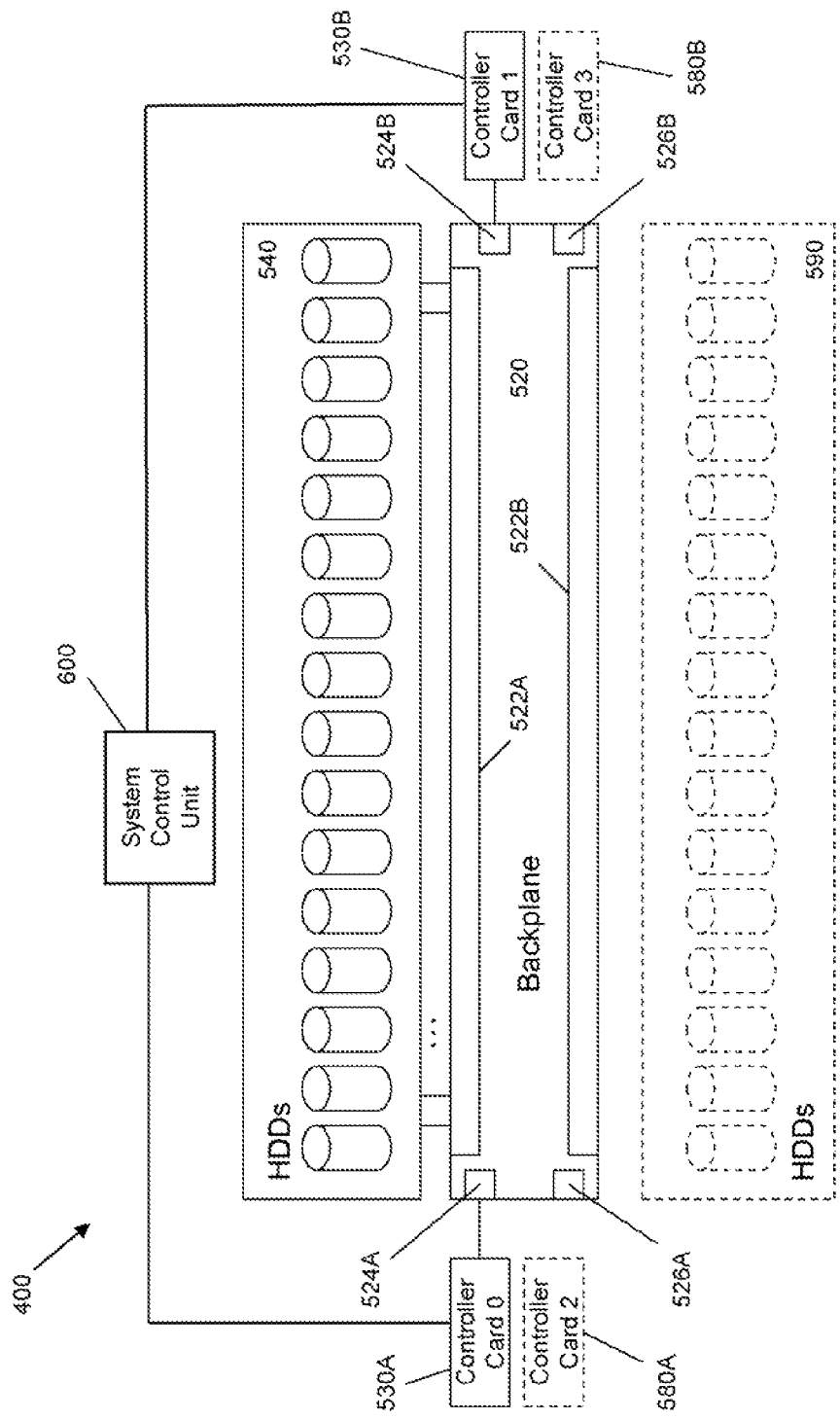
FIG. 5A is a block diagram of a flexible low- or high-density storage enclosure configurable as a single enclosure or as multiple virtual enclosures.

Implementing the present invention and as illustrated in FIG. 5A, a vendor may market a highly flexible storage enclosure, one which is configurable in a number of different ways. In one configuration, the enclosure 400 may be populated in a low density fashion, such as with up to sixteen drives 540 installed in drive connectors 522A on a backplane 520 and two redundant controller cards 530A, 530B installed in controller card connectors 524A, 524B on the backplane 520. In a second configurations the enclosure 400 may be populated in a high density fashion, such as with up to an additional sixteen drives 590 installed in drive connectors 522B and an additional pair of redundant controller cards 580A, 580B installed in card connectors 526A, 526B, configured as two virtual storage enclosures (as will be described with respect to FIG. 5B). In a third configurations the enclosure 400 may be populated in a high density fashion, such as with thirty-two drives, but configured as a single storage enclosure.

Figure 5B:
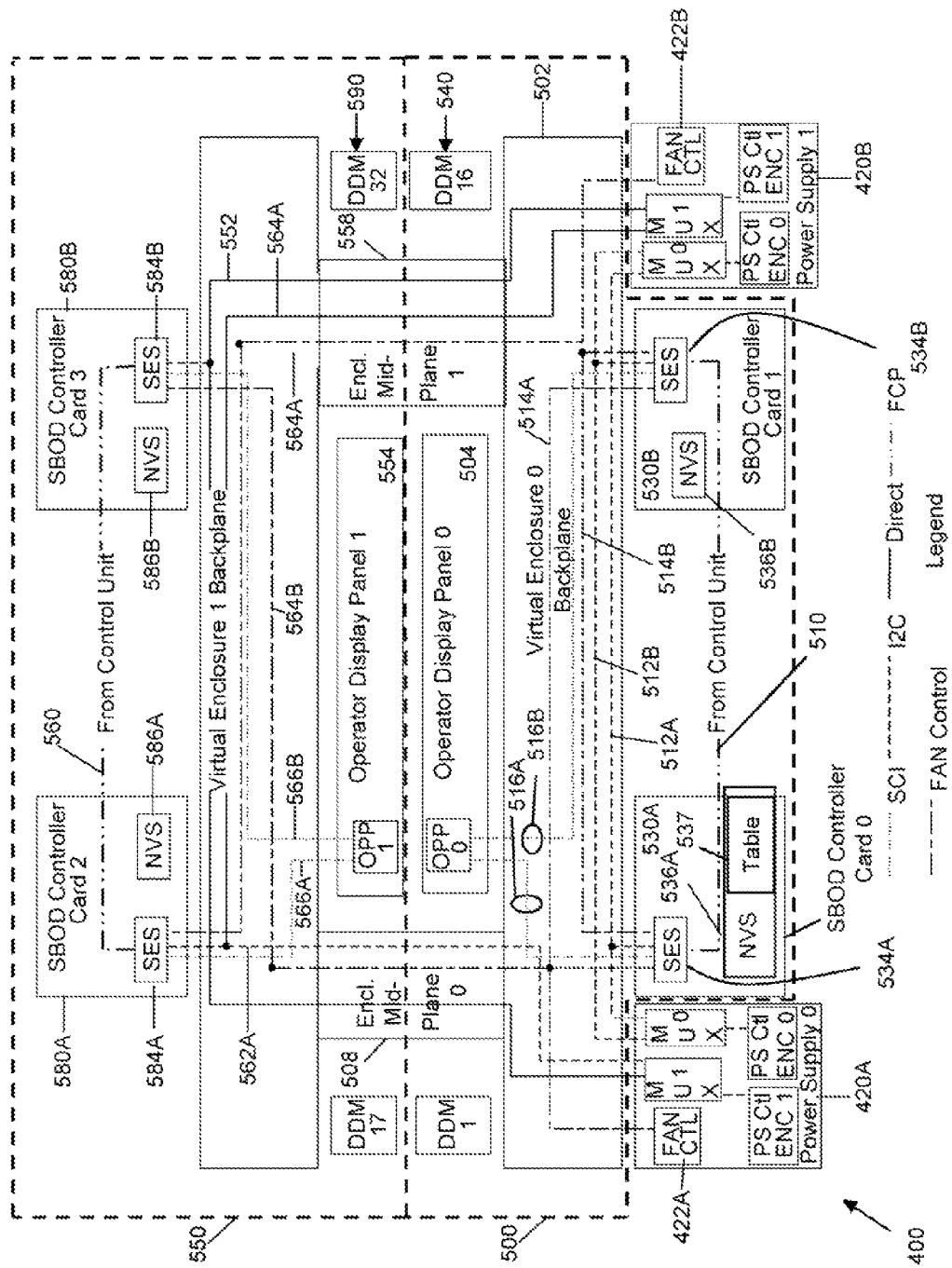
FIG. 5B is a block diagram of the flexible storage enclosure of FIG. 5A in a high-density configuration partitioned into two virtual enclosures on independent domains.

The controlling software, firmware or microcode is substantially the same with any of the three arrangements. The enclosure configuration may be performed when the enclosure 400 is installed or modified in a customer's facility. The SES processors 530A, 530B, 580A, 580B are coupled to a configuration unit, such as a notebook PC via the lines 510, 560 (FIG. 5B). One of the virtual enclosures, such as the first enclosure 500, is designated as the master enclosure (although the other enclosure 550 may instead be designated as the master). Nonvolatile storage 536A associated with the processor 530A in the master enclosure stores an SES table 537 into which parameters are loaded from the configuration unit to define the enclosure configuration. The table 537 is then accessed by the processor 530A and enables and disables links within the physical enclosure 400 to configure the enclosure 400 as a single instance of a storage enclosure or with multiple instances of virtual enclosures.

FIG. 5B is a block diagram of the storage enclosure 400 of FIG. 5A in a high-density configuration and partitioned into two virtual enclosures 500, 550. As will be described below, each power supply 420A, 420B may each be associated with one of the virtual enclosures although they are shared by both virtual enclosures 500, 550 for redundancy purposes. The first virtual enclosure 500 includes sixteen DDMs 540 and a redundant pair of controller cards 530A, 530B. Both controller cards 530A, 530B include a switch 532A, 532B (see FIGS. 6A, 6B), a SCSI enclosure services (SES) processor 534A, 534B and associated memory, such as nonvolatile storage (NVS) 536A, 536B. The backplane 520 may be partitioned into two (or more) virtual backplanes 502, 552 as part of the two virtual enclosures 500, 550, respectively. One virtual backplane 502 interconnects the components of the first virtual enclosure 500 and an operator display panel 504 provides a display of the status of the enclosure 500. A path 510, such as a Fibre Channel/Arbitrated Loop (FC-AL) link, interconnects the two SES processors 534A, 534B with the external system control unit. Redundant paths 512A, 512B, such as an inter-IC (I²C) bus, provide control paths from each SES processor 534A, 534B to each power supply 420A, 420B. Similarly, redundant paths 514A, 514B provide control paths from each SES processor 534A, 534B to a fan controller 422A, 422B in each power supply 420A, 420B. And, paths 516A, 516B interconnect each SES processor 534A, 534B with the first operator display panel 504.

Similarly, the second virtual enclosure 550 includes sixteen DDMs 590 and a redundant pair of controller cards 580A, 580B. Both controller cards 580A, 580B include a switch 532A, 532B (see FIGS. 6A, 6B), an SES processor 584A, 584B and associated memory, such as NVS 586A, 586B. The second virtual backplane 552 interconnects the components of the second virtual enclosure 550 and an operator display panel 554 provides a display of the status of the enclosure 550. A path 560, such as an FC-AL link, interconnects the two SES processors 584A, 584B with the external system control units. Redundant paths 562A, 562B, such as an I²C bus, provide control paths from each SES processor 584A, 584B to each power supply 420A, 420B. Similarly, redundant paths 564A, 564B provide control paths from each SES processor 584A, 584B to a fan controller 422A, 422B in each power supply 420A, 420B. And, paths 566A, 566B interconnect each SES processor 584A, 584B with the second operator display panel 554.

Virtual enclosure midplanes 508, 558 interconnect the backplanes 502, 552 of the two virtual enclosures 500, 550.

Thus, the logical partitioning of the physical enclosures provides each of the two virtual enclosures 500, 550 with the disk fabric loop or network interconnections that they would have in the single enclosure design of FIG. 1. It will be appreciated that the physical enclosure may be configured as more than two virtual enclosures within the scope of the present invention.

Figure 6A:
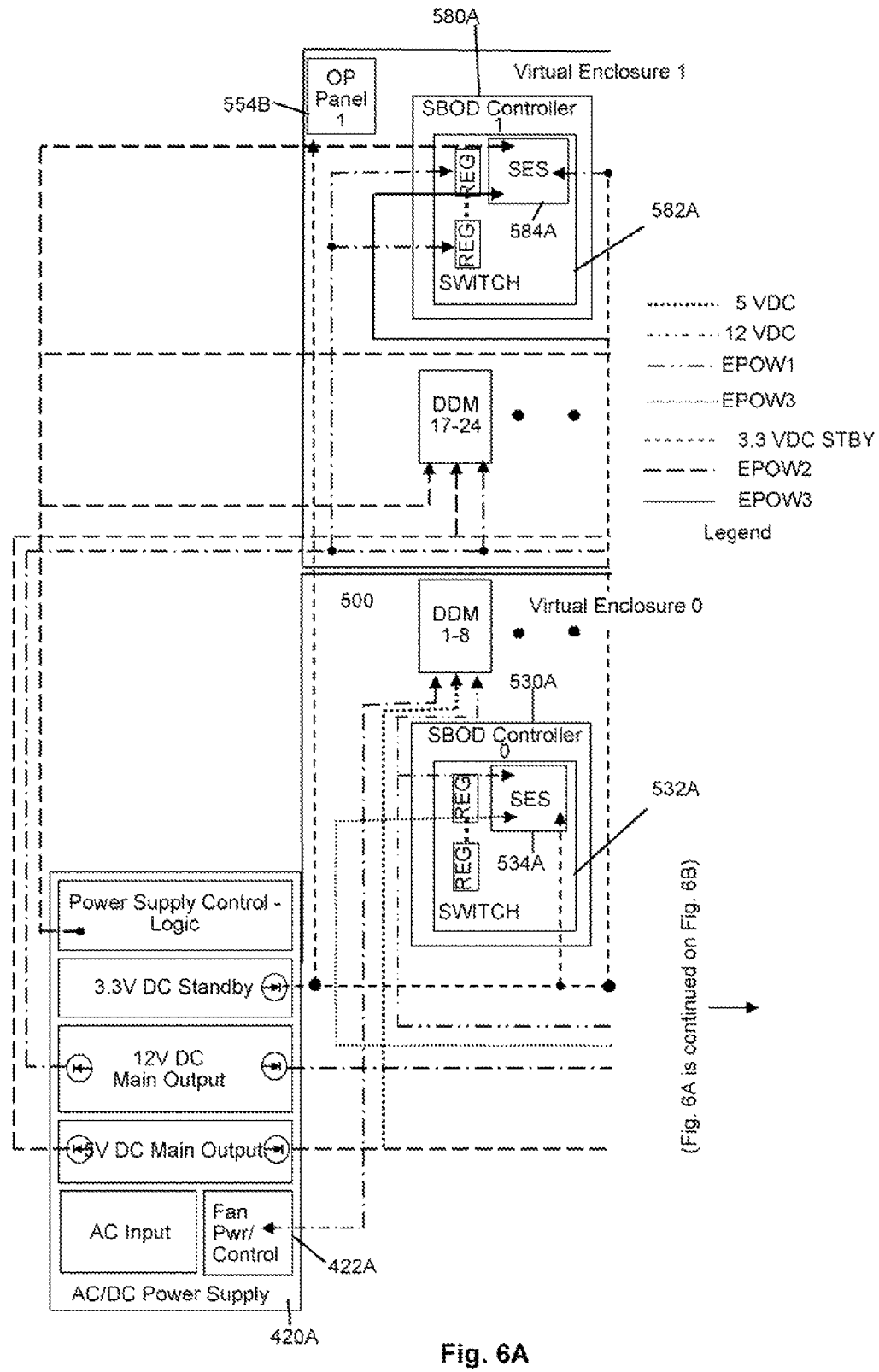
FIGS. 6A and 6B illustrate a block diagram of the power distribution system of the high-density storage enclosure of FIG. 5B.
Figure 6B:
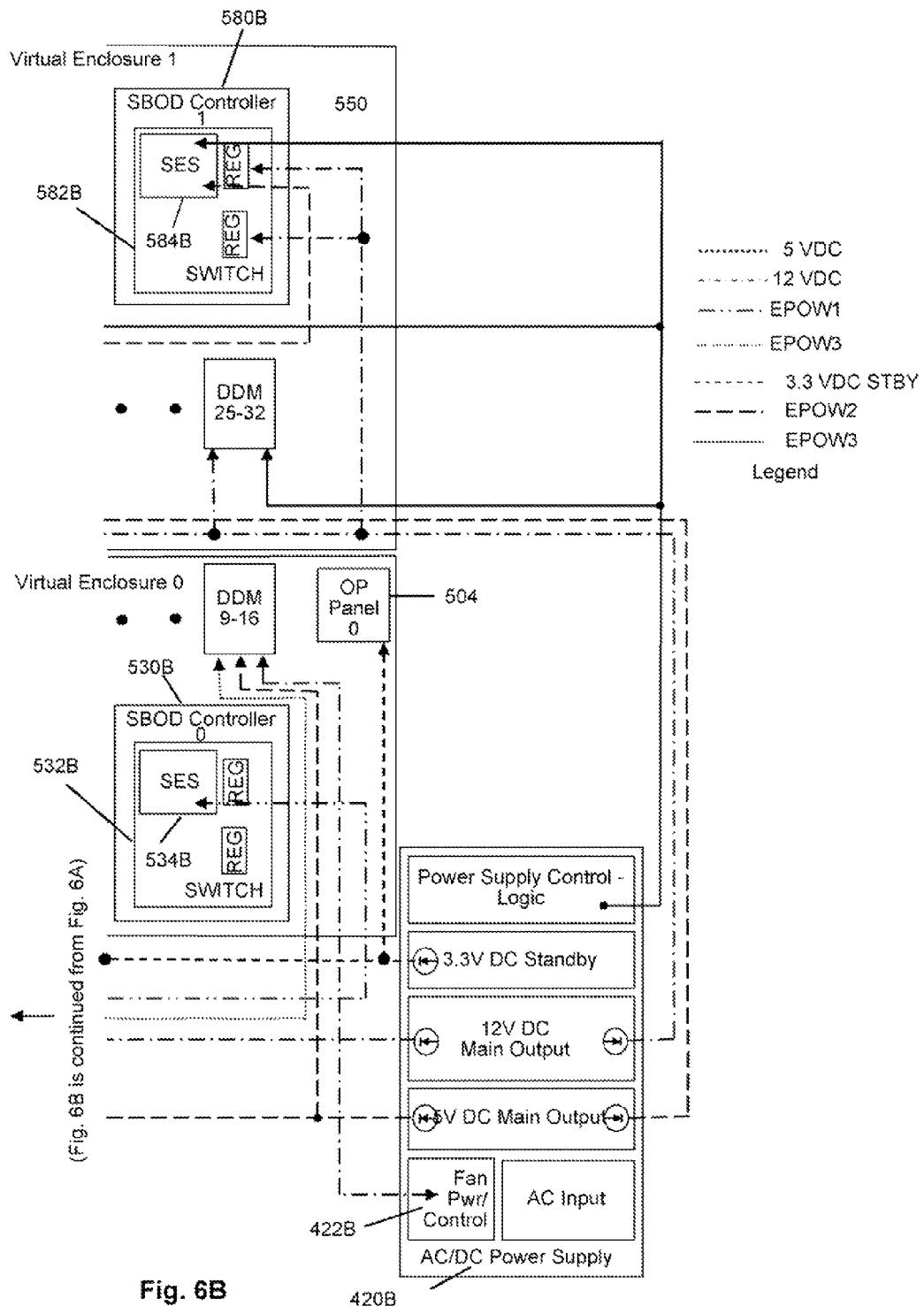

FIGS. 6A and 6B are a block diagram of the distribution of power from the power supplies 420A, 420B to the various components of the two virtual enclosures 500, 550. As with the disk fabric network interconnections, the logical partitioning of the physical enclosures provide each of the two virtual enclosures 500, 550 with the power distribution and control functions that they would have in the single enclosure design of FIG. 1. According to the present invention, the first power supply 420A and first blower 440A (FIG. 4B) and the second power supply 420B and second blower 440B (FIG. 4B) each have independently controlled power outputs for the virtual enclosures 500 and 550. When the system is configured as a single unit, the outputs are coordinated as a single redundant power system. When configured as virtual enclosures, the outputs are controlled to allow each enclosure instance to manage the outputs as a separate redundant power system for each one.

Figure 7:
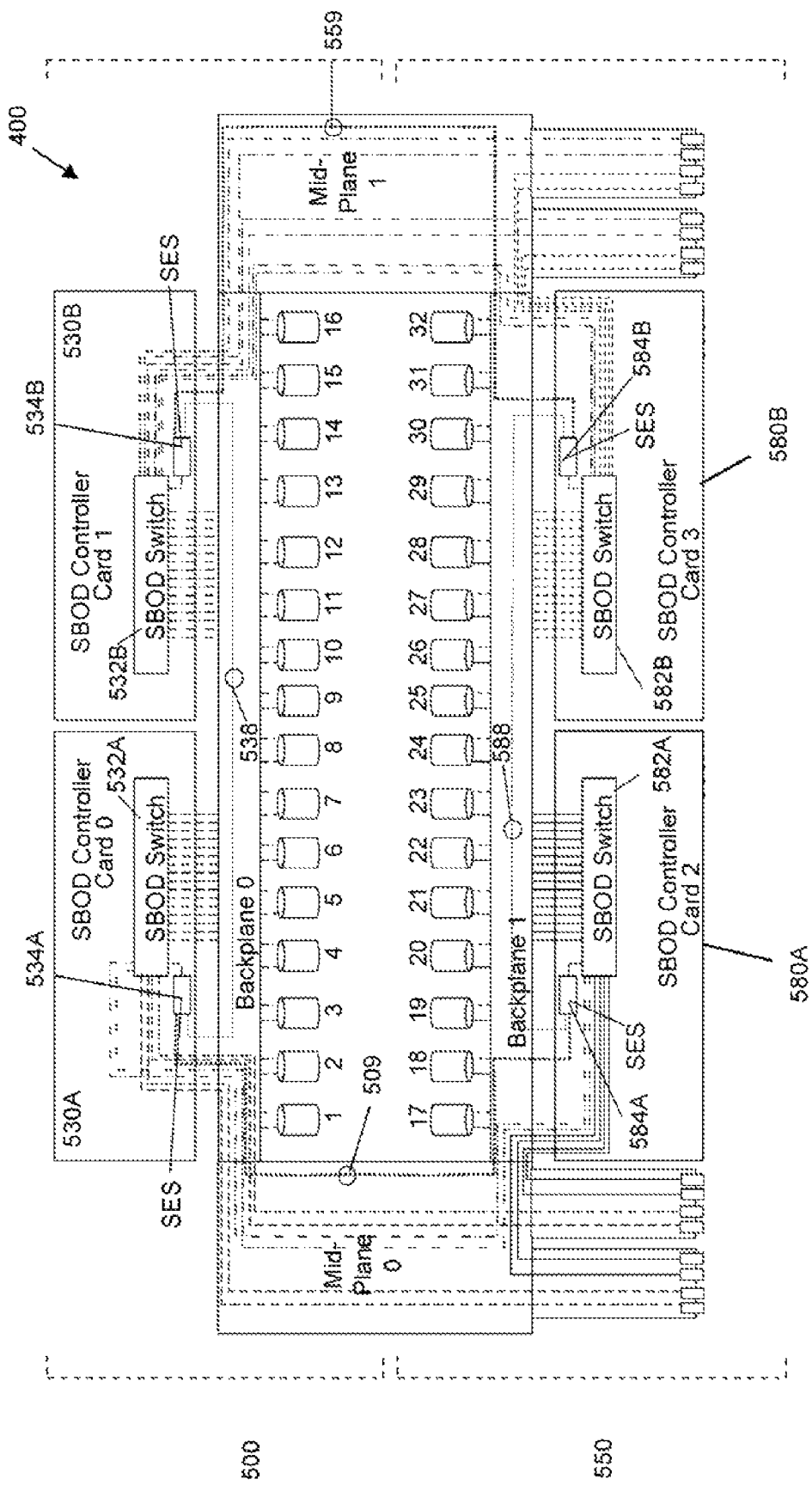
FIG. 7 is a block diagram of a dual-virtual high-density storage enclosure highlighting inter-virtual enclosure communications.

FIG. 7 is a block diagram of the dual-virtual enclosure high-density storage enclosure 400 of the present invention highlighting communications paths among the SES processors 534A, 534B, 584A, 584B of the two virtual enclosures 500, 550. One link 538 in the first virtual enclosure 500 provides intra-enclosure communication between the SES processors 534A, 534B while a corresponding link 588 in the second virtual enclosure 550 provides intra-enclosure communication between the SES processors 584A, 584B, thereby providing redundancy and allowing the storage enclosure 400 to remain in operation in the event one SES processor fails. Another link 509 provides inter-enclosure communication between the SES processor 534A on a controller card 530A in the first virtual enclosure 500 and the SES processor 584A on a controller card 580A in the second virtual enclosure 550. And, a corresponding link 559 provides inter-enclosure communication between the SES processor 534B on the other controller card 530B in the first virtual enclosure 500 and the SES processor 584B on the other controller card 580B in the second virtual enclosure 550. In the present invention, during normal operations, the inter-enclosure links 509, 559 are disabled.

Figure 8:
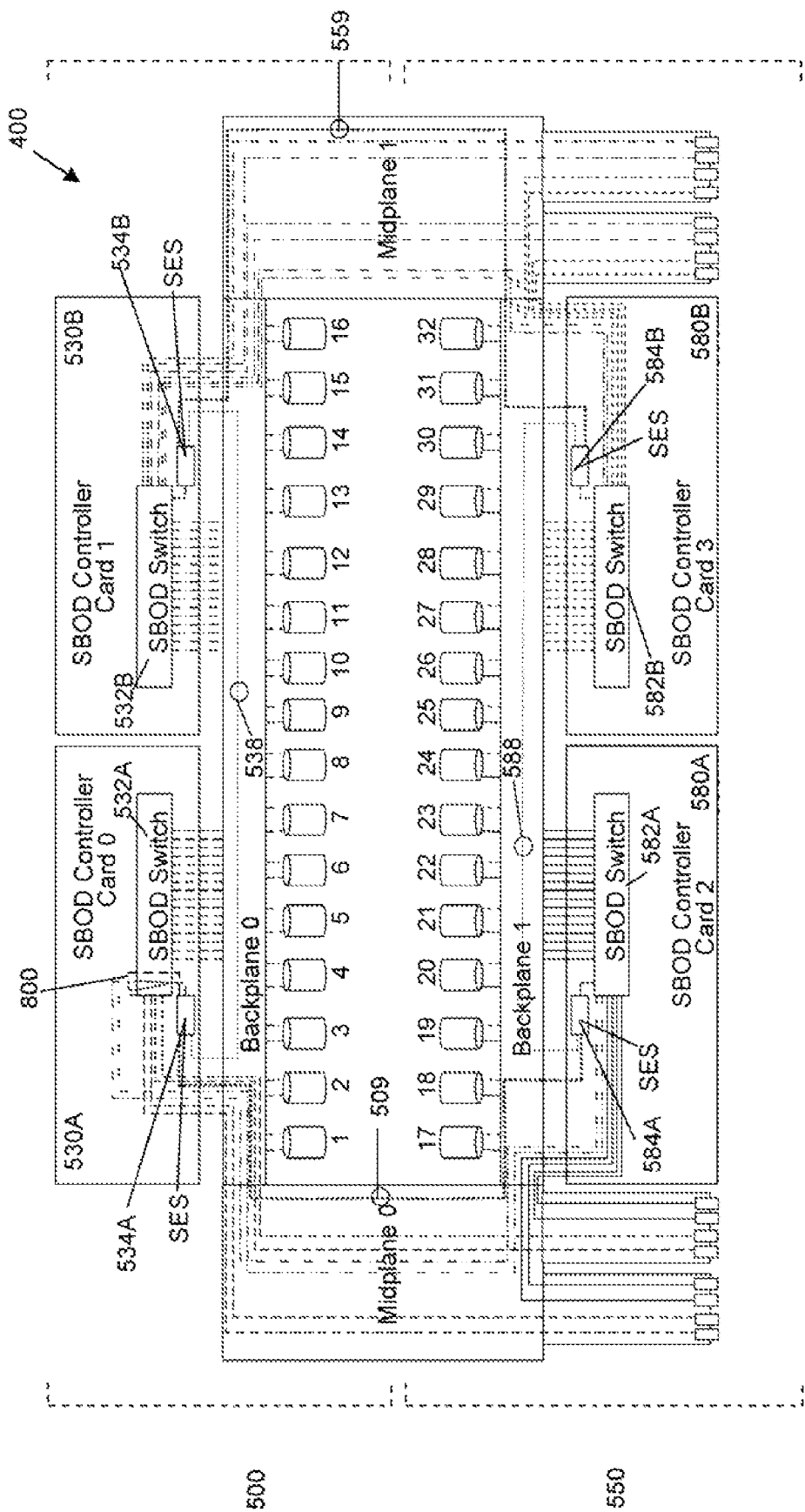
FIG. 8 is a block diagram of dual-virtual enclosure of FIG. 7 which has been reconfigured in response to a failure in one of the virtual enclosures.

FIG. 8 is a block diagram of dual-virtual enclosure 400 of FIG. 7 which has been reconfigured in response to a failure in one of the virtual enclosures 500. A system control unit 600 (FIG. 5A) detects the failure in the virtual enclosure 500. The system controller 600 then directs SES processor 584A to enable communication path 509 such that SES processor 584A and SES processor 534A are able to communicate with each other. In one embodiment, the inter-enclosure links 509, 559 comprise an out-of-band communication fabric such as I²C and enable the SES processor of one virtual enclosure to serve as a proxy for the other and forward communications, such as inquiries and commands, received from sources external to the physical enclosure 400. In another embodiment, the inter-virtual enclosure links are FC-AL.

In yet another embodiment, once the inter-enclosure communication path is enabled, the system control unit 600 directs the SES processor 534A to reconfigure the switch 532A whereby only the SES processor 534A of the failed enclosure 500 is within a zone which includes ports to the switch 534A. This reconfiguration function is represented in FIG. 8 by a switch block 800 associated with the switch 532A.

The system control unit 600 then directs SES processor 584A to configure switch 582A to enable the internal inter-enclosure communication path directly from the switch 582A to the switch 532A. The new switch configuration establishes communication directly between the system control unit 600 and SES processor 534A of the faulty virtual enclosure 500. Thus, the SES processor 534A is effectively isolated from the remainder of the degraded enclosure and a path is established to enable the system control unit 600 and storage management software to directly communicate with the SES processor 534A in the failed enclosure 500. Such communications preferably includes data collection related to the failure as well as commands which are part of the recovery process to bring the disabled or degraded domain (virtual enclosure) back in service. It will be appreciated that the foregoing process may also be used to establish a zone to provide communications in the opposite direction or to provide communications in either direction between the other SES processors 534B, 584B.

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies regardless of the particular type of signal bearing media actually used to carry out the distribution. Examples of computer readable storage media include recordable-type media such as a floppy disk, a hard is drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. For example, certain components have been described as being coupled to a backplane and other components as being coupled to a midplane. However, such description is not intended to limit components to being coupled to either a backplane or to a mid-plane. Rather, either a backplane and a mid-plane may used and both may be generically labeled as a "connector plane." Moreover, although described above with respect to methods and systems, the need in the art may also be met with a computer program product containing instructions for logically partitioning disk storage enclosures or a method for deploying computing infrastructure comprising integrating computer readable code into a computing system for logically partitioning disk storage enclosures.

What is claimed is:

1. A high density data storage enclosure, comprising:
   an enclosure connector plane;
   a first plurality of hard disk drives (HDDs), each first hard disk drive coupled to the enclosure connector plane;
   a second plurality of HDDs, each second HDD coupled to the enclosure connector plane;
   a first pair of redundant controller cards associated with the first plurality of HDDs, comprising:
      a first controller card comprising a first switch coupled to the enclosure connector plane and a first storage enclosure services (SES) processor coupled to the first switch; and
      a second controller card comprising a second switch coupled to the enclosure connector plane and a second SES processor coupled to the second switch;
   a second pair of redundant controller cards associated with the second plurality of HDDs, comprising:
      a third controller card comprising a third switch coupled to the enclosure connector plane and a third SES processor coupled to the third switch; and
      a fourth controller card comprising a fourth switch coupled to the enclosure connector plane and a fourth SES processor coupled to the fourth switch;
   a first virtual enclosure comprising:
      the first and second controller cards;
      a first virtual connector plane partitioned from the enclosure connector plane and to which the first and second controller cards are coupled, the first virtual connector plane including a path through which the first and second SES processors are coupled; and
      the first plurality of HDDs;
   a second virtual enclosure comprising:
      the third and fourth controller cards;
      a second virtual connector plane partitioned from the enclosure connector plane and to which the third and fourth controller cards are coupled, the second virtual connector plane including a path through which the third and fourth SES processors are coupled; and
      the second plurality of HDDs;
   an inter-enclosure link between the first and third SES processors, the inter-enclosure link being disabled during normal operations of the storage enclosure; and
   a system control unit, comprising:
      means for detecting a failure in the first virtual enclosure;
      means for enabling the inter-enclosure link whereby the first SES processor is isolated from the balance of the first virtual enclosure; and
      means for accessing the first SES processor to obtain data associated with the failure in the first virtual enclosure and to transmit commands associated with a recovery process of the first virtual enclosure.

2. The high density data storage enclosure of claim 1, wherein the inter-enclosure link comprises an FC-AL link.

3. The high density data storage enclosure of claim 1, wherein the inter-enclosure link comprises an out-of-band communication fabric.

4. The high density data storage enclosure of claim 3, wherein the out-of-band communication fabric comprises an I$^2$C bus.

5. The high density data storage enclosure of claim 1, wherein, when the inter-enclosure link is enabled, the third SES processor is operable as a proxy for the first SES processor.

6. A method for managing a high density data storage enclosure configured into a plurality of virtual enclosures, the method comprising:
   providing:
      an enclosure connector plane;
      a first plurality of hard disk drives (HDDs), each first hard disk drive coupled to the enclosure connector plane:
      a second plurality of HDDs, each second HDD coupled to the enclosure connector plane;
      a first pair of redundant controller cards associated with the first plurality of HDDs, comprising:
         a first controller card comprising a first switch coupled to the enclosure connector plane and a first storage enclosure services (SES) processor coupled to the first switch: and a second controller card comprising a second switch coupled to the enclosure connector plane and a second SES processor coupled to the second switch;

a second pair of redundant controller cards associated with the second plurality of HDDs, comprising:

a third controller card comprising a third switch coupled to the enclosure connector plane and a third SES processor coupled to the third switch; and a fourth controller card comprising a fourth switch coupled to the enclosure connector plane and a fourth SES processor coupled to the fourth switch;

a first virtual enclosure comprising:

the first and second controller cards;

a first virtual connector plane partitioned from the enclosure connector plane and to which the first and second controller cards are coupled, the first virtual connector plane including a path through which the first and second SES processors are coupled; and the first plurality of HDDs;

a second virtual enclosure comprising:

the third and fourth controller cards:

a second virtual connector plane partitioned from the enclosure connector plane and to which the third and fourth controller cards are coupled, the second virtual connector plane including a path through which the third and fourth SES processors are coupled; and the second plurality of HDDs;

an inter-enclosure link between the first and third SES processors, the inter-enclosure link being disabled during normal operations of the storage enclosure;

detecting a failure in a first of the virtual enclosures;

in response to the detection of a failure, enabling the inter-enclosure link to isolate the first SES processor in the first virtual enclosure from the balance of the first virtual enclosure; and after enabling the inter-enclosure link, accessing the first SES processor from the second virtual enclosure through the enabled inter-enclosure link to obtain data associated with the failure in the first virtual enclosure and to transmit commands associated with a recovery process of the first virtual enclosure.

7. The method of claim 6, wherein enabling the inter-enclosure link comprises enabling an FC-AL link.

8. The method of claim 6, wherein enabling the inter-enclosure link comprises enabling an out-of-band communication fabric.

9. The method of claim 8, wherein enabling the out-of-band communication fabric comprises enabling an I²C bus.

10. The method of claim 6, further comprising operating the second SES processor in the second virtual enclosure as a proxy for the first SES processor in the first virtual enclosure when the inter-enclosure link is enabled.

11. The method of claim 6, further comprising obtaining failure-related data from the first SES processor when the inter-enclosure link is enabled.

12. The method of claim 6, further comprising transmitting recover-related commands to the first SES processor when the inter-enclosure link is enabled.

13. A computer program product of a computer readable storage medium usable with a programmable computer, the computer program product having computer-readable code embodied therein for managing a high density data storage enclosure having an enclosure connector plane, first and second pluralities of hard disk drives (HDDs), each HDD coupled to the enclosure plane, a first pair of redundant controller cards associated with the first plurality of HDDs and comprising a first controller card comprising a first switch coupled to the enclosure connector plane and a first storage enclosure services (SES) processor coupled to the first switch and a second controller card comprising a second switch coupled to the enclosure connector plane and a second SES processor coupled to the second switch, the data storage enclosure further comprising a second pair of redundant controller cards associated with the second plurality of HDDs, comprising a third controller card comprising a third switch coupled to the enclosure connector plane and a third SES processor coupled to the third switch and a fourth controller card comprising a fourth switch coupled to the enclosure connector plane and a fourth SES processor coupled to the fourth switch, the data storage enclosure configured into a plurality of virtual enclosures including a first virtual enclosure comprising the first and second controller cards, a first virtual connector plane partitioned from the enclosure connector plane and to which the first and second controller cards are coupled, the first virtual connector plane including a path through which the first and second SES processors are coupled and the first plurality of HDDs, the plurality of virtual enclosures further including a second virtual enclosure comprising the third and fourth controller cards, a second virtual connector plane partitioned from the enclosure connector plane and to which the third and fourth controller cards are coupled, the second virtual connector plane including a path through which the third and fourth SES processors are coupled and the second plurality of HDDs, the computer-readable code comprising instructions for:

detecting a failure in the first virtual enclosure;

enabling an inter-enclosure link between the first and third SES processors, the inter-enclosure link being disabled during normal operations of the storage enclosure, to isolate the first SES processor in the first virtual enclosure from the balance of the first virtual enclosure; and after enabling the inter-enclosure link, accessing the first SES processor from the second virtual enclosure through the enabled inter-enclosure link to obtain data associated with the failure in the first virtual enclosure and to transmit commands associated with a recovery process of the first virtual enclosure.

14. The computer program product of claim 13, wherein the instructions for enabling the inter-enclosure link comprise instructions for enabling an FC-AL link.

15. The computer program product of claim 13, wherein the instructions for enabling the out-of-band communication fabric comprise instructions for enabling an I²C bus.

16. The computer program product of claim 13, the computer-readable code further comprising instructions for operating the second SES processor in the second virtual enclosure as a proxy for the first SES processor in the first virtual enclosure when the inter-enclosure link is enabled.

17. A method for deploying computing infrastructure, comprising integrating computer readable code, stored on a computer readable storage medium, into a computing system for managing a high density data storage enclosure having an enclosure connector plane, first and second pluralities of hard disk drives (HDDs), each HDD coupled to the enclosure plane, a first pair of redundant controller cards associated with the first plurality of HDDs and comprising a first controller card comprising a first switch coupled to the enclosure connector plane and a first storage enclosure services (SES)

processor coupled to the first switch and a second controller card comprising a second switch coupled to the enclosure connector plane and a second SES processor coupled to the second switch, the data storage enclosure further comprising a second pair of redundant controller cards associated with the second plurality of HDDs, comprising a third controller card comprising a third switch coupled to the enclosure connector plane and a third SES processor coupled to the third switch and a fourth controller card comprising a fourth switch coupled to the enclosure connector plane and a fourth SES processor coupled to the fourth switch, the data storage enclosure configured into a plurality of virtual enclosures including a first virtual enclosure comprising the first and second controller cards, a first virtual connector plane partitioned from the enclosure connector plane and to which the first and second controller cards are coupled, the first virtual connector plane including a path through which the first and second SES processors are coupled and the first plurality of HDDs, the plurality of virtual enclosures further including a second virtual enclosure comprising the third and fourth controller cards, a second virtual connector plane partitioned from the enclosure connector plane and to which the third and fourth controller cards are coupled, the second virtual connector plane including a path through which the third and fourth SES processors are coupled and the second plurality of HDDs, wherein the code, in combination with the computing system, is capable of performing the following:

detecting a failure in the first virtual enclosure;

in response to the detection of a failure, enabling an inter-enclosure link between the first and third SES processors, the inter-enclosure link being disabled during normal operations of the storage enclosure, to isolate the first SES processor in the first virtual enclosure from the balance of the first virtual enclosure; and after enabling the inter-enclosure link, accessing the first SES processor from the second virtual enclosure through the enabled inter-enclosure link to obtain data associated with the failure in the first virtual enclosure and to transmit commands associated with a recovery process of the first virtual enclosure.

18. The method of claim 17, wherein enabling the inter-enclosure link comprises enabling an FC-AL link.

19. The method of claim 17 wherein enabling the out-of-band communication fabric comprises enabling an I$^2$C bus.

20. The method of claim 17, further comprising operating the second SES processor in the second virtual enclosure as a proxy for the first SES processor in the first virtual enclosure when the inter-enclosure link is enabled.

* * * * *